(12) United States Patent
Briesemeister

(10) Patent No.: US 6,463,725 B1
(45) Date of Patent: Oct. 15, 2002

(54) TREE HARVESTER TRUNK SEAL

(75) Inventor: Richard A. Briesemeister, Clear Lake, WI (US)

(73) Assignee: Oxbo International Corporation, Clear Lake, WI (US)

( * ) Notice: Subject to any disclaimer, the term of this patent is extended or adjusted under 35 U.S.C. 154(b) by 0 days.

(21) Appl. No.: 09/665,233

(22) Filed: Sep. 18, 2000

(51) Int. Cl.$^7$ .............................................. A01D 46/00
(52) U.S. Cl. ...................... 56/340.1; 56/328.1
(58) Field of Search .......................... 56/10.2 D, 340.1, 56/327.1, 328.1, 330

(56) References Cited

U.S. PATENT DOCUMENTS

| | | | | |
|---|---|---|---|---|
| 3,184,908 A | * | 5/1965 | Rust | 56/330 |
| 3,325,984 A | * | 6/1967 | Christie et al. | 56/330 |
| 3,449,895 A | * | 6/1969 | Pertics | 56/330 |
| 3,538,694 A | * | 11/1970 | Holloway | 56/330 |
| 3,690,054 A | * | 9/1972 | De Carlo et al. | 56/330 |
| 4,134,251 A | * | 1/1979 | Burton | 56/330 |
| 4,341,062 A | * | 7/1982 | Scudder | 56/330 |
| 4,750,322 A | * | 6/1988 | Korthuis | 56/328.1 |
| 4,972,662 A | * | 11/1990 | Korthuis et al. | 56/10.2 R |
| 4,976,094 A | * | 12/1990 | Williamson et al. | 56/330 |
| 5,092,113 A | * | 3/1992 | Turunen | 56/330 |
| 5,109,657 A | | 5/1992 | De Vries | |
| 5,170,614 A | * | 12/1992 | Williamson et al. | 56/330 |
| 5,181,373 A | | 1/1993 | Littau | |
| 5,341,630 A | | 8/1994 | Littau | |
| 5,495,708 A | * | 3/1996 | Scott et al. | 56/329 |
| 5,647,194 A | * | 7/1997 | Scott et al. | 56/328.1 |
| 6,178,730 B1 | * | 5/1998 | Visser | 56/340.1 |
| 5,956,933 A | | 9/1999 | Heard | |

* cited by examiner

*Primary Examiner*—Thomas B. Will
*Assistant Examiner*—Árpád F. Kovács
(74) *Attorney, Agent, or Firm*—Merchant & Gould P.C.

(57) ABSTRACT

A harvester for gathering product from one or more plants comprises a drive mechanism, a retractable conveyor mounted to and extending from the drive mechanism towards the plant, and a sealing arrangement mounted at a distal end of the retractable arm. The sealing arrangement includes a sealing member and sensor configured to engage the plants and provide input to the retractable conveyor so as to maintain a predetermined distance between the distal end of the retractable arm and the second object. As a result, a seal is formed and maintained between the first object and the second object.

11 Claims, 9 Drawing Sheets

TREE HARVESTER TRUNK SEAL

TECHNICAL FIELD

The present invention relates to harvesting systems, and more particularly, to harvesting systems having a sealing arrangement for maintaining the harvester a predetermined distance from the plant such that a seal is maintained between the harvester and one or more plants.

BACKGROUND

Mechanized harvesters are well known and provide several advantages over traditional manual harvesting methods. One of the advantages provided by mechanized harvesters is that the time required to remove and gather produce from each of the plants is significantly reduced. Likewise, the overall cost of removing and gathering the produce from each of the plants is significantly reduced. Because of these advantages, the use of mechanized harvesters to harvest fruit, vegetables, or other produce from various plants, such as trees or vines, has increased considerably.

Despite these advantages, there can be disadvantages associated with the use of mechanized harvesters. One of the disadvantages associated with mechanized harvesters is the potential to lose produce as it falls to the ground while the harvester advances through the field. To minimize the amount of produce that falls to the ground, however, many mechanized harvesters currently exist that have been equipped with conveyor systems that are positioned beneath the foliage of the tree or plant being harvested. These conveyor systems are constructed and arranged to catch produce as it falls from the plant and move it to a larger storage bin located on or adjacent to the harvester.

However, these conveyors are typically rigidly affixed to the harvester. Thus, in order for the conveyor to maintain a position proximate to the tree or plant to minimize the amount of produce lost, the operator is typically required to continuously adjust the path of the harvester. As a result, the distance between the harvester and the tree varies as the harvester advances.

In one scenario, as the distance between the harvester and the tree line increases, the amount of produce lost is also increased. Thus, the overall efficiency and cost-savings is reduced. In another scenario, as the distance between the harvester and the tree line decreases, the potential for damage to the harvester and/or the trees is increased.

Improvements in harvesters and seals used to maintain a seal between a first object and a second object are sought.

SUMMARY OF THE DISCLOSURE

The present disclosure generally relates to an apparatus for maintaining a seal between a first object and a second object. More particularly, the present disclosure is directed towards an apparatus for maintaining a first object a predetermined distance from a second object such that a seal is maintained between the first object and the second object.

In one aspect, the device comprises a retractable arm mounted to and extending from the first object towards the second object. The retractable arm is selectively positionable between at least a first position and a second position. The device also comprises a sealing arrangement mounted at a distal end of the retractable arm. The sealing arrangement includes a sealing member and a sensor configured to engage the second object and provide input to the retractable arm so as to maintain a predetermined distance between the distal end of the retractable arm and the second object. As a result, a seal is formed and maintained between the first object and the second object.

In one aspect, the sealing member comprises a plurality of overlapping pivot plates pivotably mounted at the distal end of the retractable arm. The overlapping pivot plates are further constructed and arranged to accommodate the second object as the first object travels along a first direction. Furthermore, in this aspect, the sensor comprises a sensor bar extending along the width of the distal end of the retractable arm. The sensor bar is configured to engage the second object as the first object travels along a first direction.

In an alternative aspect, the sealing member and the sensor comprise a plurality of overlapping pivot plates pivotably mounted at the distal end of the retractable arm. In this aspect, the plurality of overlapping pivot plates are constructed and arranged to accommodate the second object as the first object travels along a first direction.

The disclosure also relates to a harvester for gathering product from one or more plants. The harvester comprises a drive mechanism for automatically advancing the harvester along a first direction relative to the plants. A retractable arm or conveyor is mounted to and extends from the drive mechanism towards the plant. The retractable arm is selectively positionable between a first position and a second position. Furthermore, the harvester also comprises a sealing arrangement mounted at a distal end of the retractable arm. The sealing arrangement includes a sealing member and a sensor configured to engage the plants and provide input to the retractable arm so as to maintain a predetermined distance between the distal end of the retractable arm and the second object. As a result, a seal is formed between the harvester and each of the plants.

The harvester can also comprise an agitator constructed and arranged to engage the plants and remove produce from the plant as the harvester moves in the first direction. In this aspect, the agitator comprises at least one whorl arrangement capable of rotating and engaging the plants to forcibly remove produce from the plant as the harvester moves in the first direction. Each of the whorls are capable of rotating about a vertical axis substantially perpendicular to the ground surface about which the harvester travels. Furthermore, each of the whorls are capable of reciprocating in a linear motion substantially forward towards and backwards away from the plant being harvested.

In one aspect, the sealing member comprises a plurality of overlapping pivot plates pivotably mounted at the distal end of the retractable arm. The overlapping pivot plates are constructed and arranged to accommodate at least one of the plants as the harvester travels along a first direction. In this aspect, the sensor comprises a sensor bar extending from a distal end of the retractable arm. The sensor bar is configured to engage a lower portion of the plants as the harvester travels along a first direction.

In an alternative aspect, the sealing member and the sensor can comprise a plurality of overlapping pivot plates mounted at the distal end of the retractable arm. In this aspect, the plurality of overlapping pivot plates are constructed and arranged to accommodate a lower portion of the plants as the harvester travels along a first direction.

The above summary of the present invention is not intended to describe each illustrated embodiment or every implementation of the present invention. Other objects, features and advantages of the present invention will become more apparent in light of the following detailed description of exemplary embodiments thereof, as illustrated in the accompanying drawings.

BRIEF DESCRIPTION OF THE DRAWINGS

The invention may be more completely understood in consideration of the following detailed description of various embodiments of the invention in connection with the accompanying drawings, in which.

Figure 1:
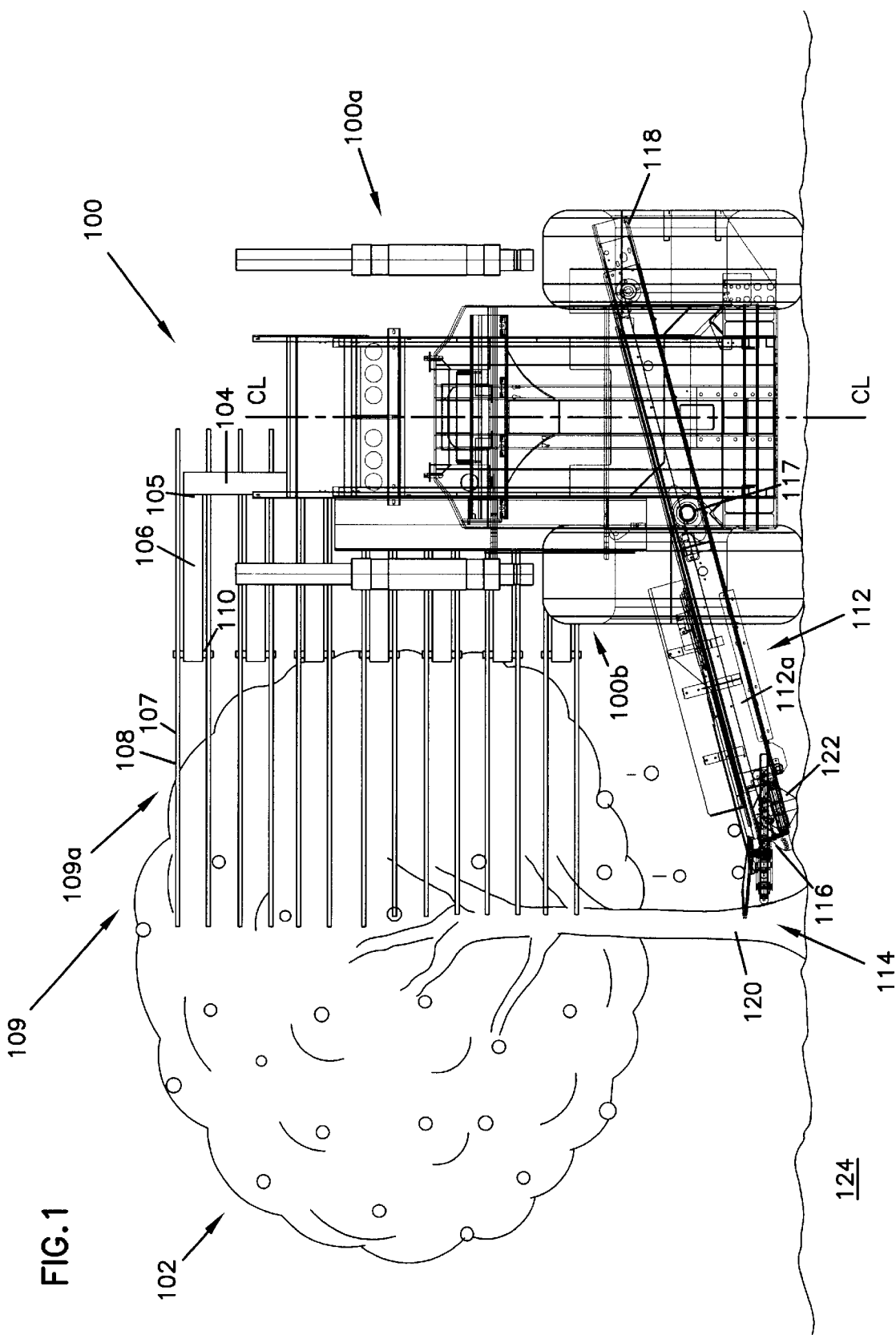
FIG. 1 is side-elevational view of a harvester for removing produce from a tree having a trunk seal in accordance with the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present disclosure generally relates to an apparatus for maintaining a seal between a first object and a second object. More particularly, the present disclosure is directed towards an apparatus for maintaining a first object a predetermined distance from a second object such that a seal is maintained between the first object and the second object. While the present invention is not so limited, a more detailed understanding of the present invention will be gained through a discussion of the drawings in connection with the examples provided below.

As will become apparent from the discussion below in connection with the accompanying drawings, the present disclosure has particularized applicability to mechanized harvesters used to harvest produce from a plant or tree. However, it will be appreciated by those having skill in the art that the present disclosure is not limited to the specific embodiments discussed below. Rather, the present disclosure has general applicability to situations where it is desirable to maintain a seal between a first object and a second object.

Referring now to FIG. 1, there is illustrated a harvester 100 operating adjacent to a plant 102. By way of illustration, the plant 102 shown in FIG. 1 is a citrus fruit tree, such as an orange or grapefruit tree. However, it should be understood that the embodiment shown in FIG. 1 is generally applicable to a variety of plants and trees, including various fruit trees as well as plants growing against a support structure, such as grapevines, or other similar plants or trees.

In one embodiment, the harvester 100 comprises a drive mechanism, such as a farm tractor or other similar device capable of moving through a grove or orchard of fruit trees 102. As will be described below, the harvester 100 is constructed and arranged to harvest produce as it moves along through a grove of fruit trees 102. In the embodiment illustrated in FIG. 1, a single harvester 100 is shown. However, preferably the harvester 100 can work in conjunction with a second harvester (not shown) while harvesting produce from one or more trees 102 in cooperation with the harvester 100. In this embodiment, each harvester 100 moves along a row of trees 102 at substantially the same rate and on opposite sides of the same tree 102. As a result, each harvester 100 removes produce from about approximately half of the tree 102.

A retractable arm 112, such as a conveyor 112a, is mounted to the harvester 100. The retractable arm 112 has a proximal end portion 118 at or near a first side 100a of the harvester 100. Similarly, the retractable arm 112 has a distal end portion 116 opposite the proximal end portion 118 at or near a location furthest away from the proximal end portion 118. The retractable arm 112 is pivotably mounted to the harvester 100 at point 117 located substantially near or at a second side 100b of the harvester 100. The retractable arm 112 is mounted at point 117 using a pin and channel arrangement (not shown) as is commonly understood in the art. As a result, the retractable arm 112 is able to pivot about point 117 and slide up and/or down as the retractable arm 112 is extended or retracted as explained below.

As shown in FIG. 1, the retractable arm 112 extends away from the harvester 100, such that it can extend beneath the foliage of the tree 102. The retractable conveyor 112 is selectively positionable between a first position and a second position. In the first position, for example, the retractable arm 112 is fully extended. In the second position, the retractable arm 112 is fully retracted. Typically, the distance the retractable conveyor or arm 112 extends from the harvester 100 varies according to the spacing between the distance between each row of trees 102 in the orchard or grove. For example, the retractable arm or conveyor 112 is positionable such that the distal end portion 116 of the retractable arm 112 can be at least about 8 feet (about 2.4 meters), no more than about 13 feet (about 4.0 meters), and in a preferred embodiment approximately about 11 feet (about 3.4 meters) from the centerline CL (FIG. 1) of the harvester 100. Thus, in the preferred embodiment, the distance the retractable conveyor or arm 112 extends from the centerline CL of the harvester 100 is optimized for harvesting produce from in an orchard or grove having 24 foot spacing.

Similarly, the retractable arm 112 has an overall width from the first side 158 of the retractable arm 112 to the second side 159 of the retractable arm 112 suitable to catch produce from the tree 102 while minimizing the amount of lost produce. Thus, for example, if used for citrus fruit trees, such as tree 102, the retractable arm 112 has a width of at least about 15 feet (about 4.6 meters), no greater than about 30 feet (about 9.1 meters), typically about 20–24 feet (about 6.1–7.3 meters), and in a preferred embodiment about 22 feet (about 6.7 meters). In this embodiment, the retractable arm 112 is typically wide enough to span beneath at least about one or more trees 102 arranged in a row substantially parallel with the direction of travel of the harvester 100 as is commonly the case in a grove or orchard.

The harvester 100 can remove the produce from the tree 102 by shaking and/or agitating the foliage of the tree 102 or in any other suitable method. For example, in one embodiment, a vertical support shaft 104 extends upwardly from the harvester 100. By "upwardly," it is meant that in the orientation of the harvester 100 shown in FIG. 1, the support shaft 104 extends above a platform (not shown) of the harvester 100 and away from and substantially perpendicular to the ground 124. The vertical support shaft 104 can be centered on the harvester 100. Alternatively, the vertical support shaft 104 can be offset to one side of the harvester 100 as shown in FIG. 1 to facilitate removal of the fruit or produce from a tree.

One or more arm members 106 are independently rotatably mounted to the support shaft 104. Each of the arm members 106 has a proximal end portion 105 at or near its point of attachment to the support shaft 104. Similarly, each of the arm members 106 has a distal end portion 107 opposite the proximal end portion 105 at or near a location furthest away from the point of attachment to the support shaft 104.

Figure 2:
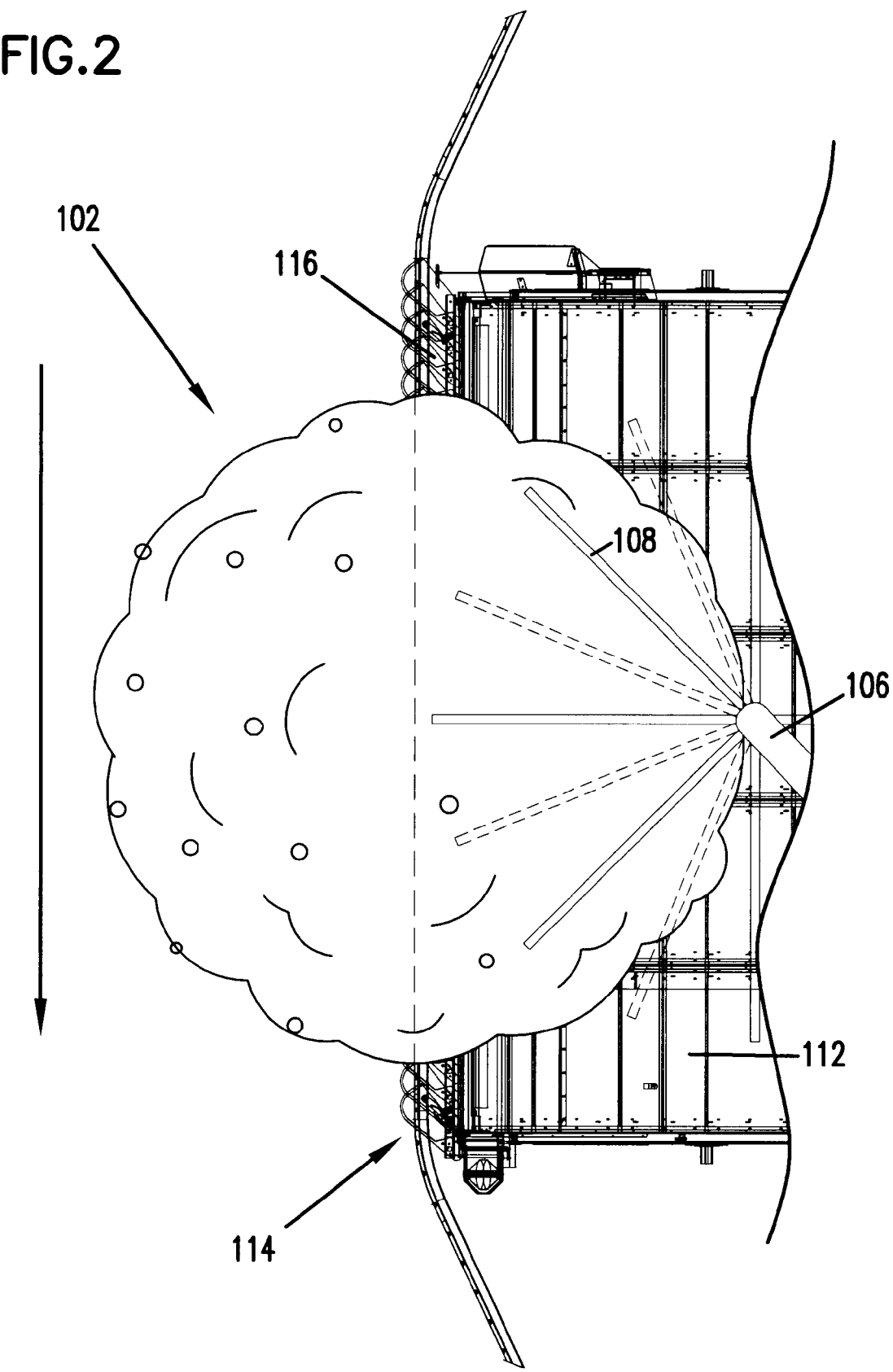
FIG. 2 is a top view illustrating the harvester for removing produce shown in FIG. 1.

An agitator 109 is mounted at or near the distal end portion 107 of each of the arm members 106. The agitator 109 is constructed and arranged to engage the tree 102 and forcibly remove the fruit or produce from the tree 102 as the harvester 100 moves along a first direction adjacent to the tree 102. In one embodiment, the agitator 109 includes one or more whorl arrangements 109a. As shown in FIGS. 1 and 2, each whorl arrangement 109a is rotatably mounted at or near the distal end portion 107 of each of the arm members 106. Moreover, each whorl arrangement 109a includes a first set of fingers 108 rotatably mounted above each arm member 106 and a second set of fingers 110 rotatably mounted below each arm member 106 as shown in FIG. 1.

The first and second set of fingers 108, 110 are constructed and arranged to engage the tree 102. For example, the first and second set of fingers 108, 110 are configured to rotate in plane substantially parallel to the ground surface 124 about which the harvester 100 travels. Similarly, the first and second set of fingers 108, 110 are capable of reciprocating in a linear motion along a direction of travel from the proximal end 105 to the distal end portion 107 of each arm member 106. As a result, the whorl arrangement agitates the foliage of the tree 102 to forcibly remove the fruit from the foliage of the tree 102 as the harvester 100 advances in a first direction adjacent to the tree 102.

A sealing arrangement 114 is provided at the distal end 116 of the retractable arm or conveyor 112 to maintain a seal between the harvester 100 and the tree 102. Specifically, the sealing arrangement 114 maintains the distal end 116 of the retractable conveyor 112 a predetermined distance from a lower portion or trunk 120 of the tree 102. As a result, a seal is maintained between the tree trunk 120 the distal end 116 of the retractable arm 112.

The sealing arrangement 114 includes a sealing member and a sensor configured to engage the lower portion or trunk 120 of the tree 102. By "engage," it is meant that the sensor contacts or comes into close association or connection with the lower portion or trunk 120 of the tree 102. In so doing, the sensor is capable of controlling the retractable arm 112 such that a seal is maintained between the harvester 100 and the trunk 120 of the tree 102. As a result, the amount of produce or fruit lost during harvesting is minimized.

Furthermore, the operator of the harvester 100 is free to focus on advancing the harvester 100 through the grove or orchard of trees 102. The sealing arrangement 114 will be discussed in greater detail below in conjunction with FIG. 4.

Figure 3:
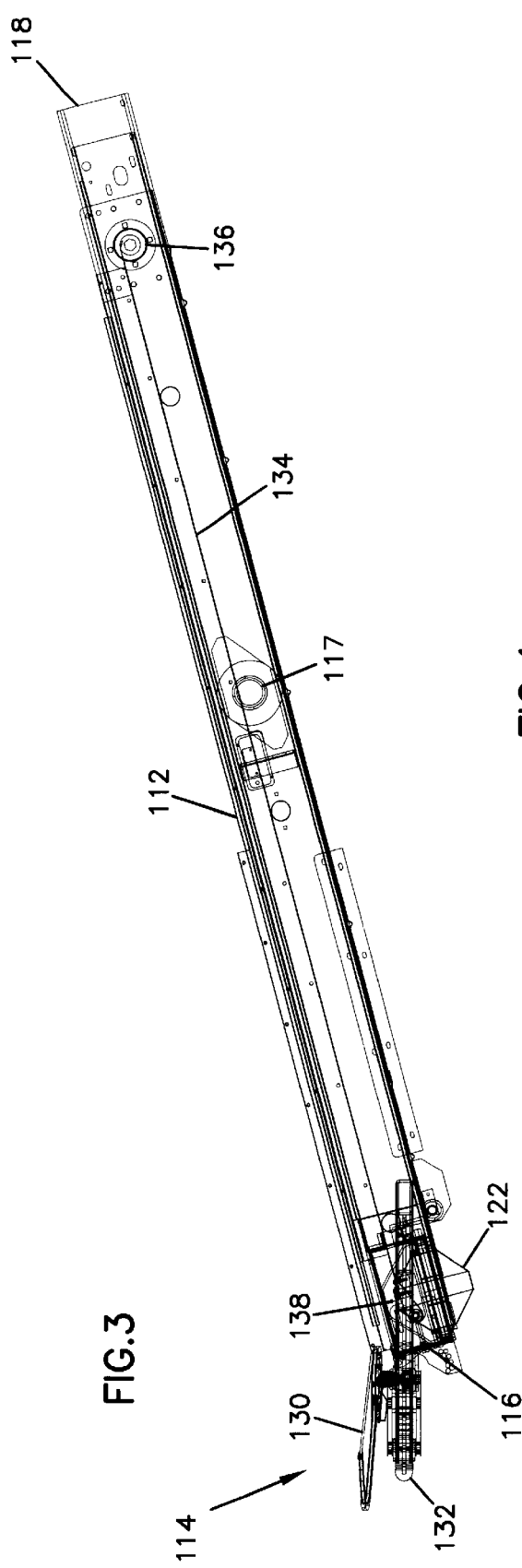
FIG. 3 is a side-elevational view illustrating a retractable arm for use with the harvester of FIG. 1 in accordance with the present disclosure.
Figure 5:
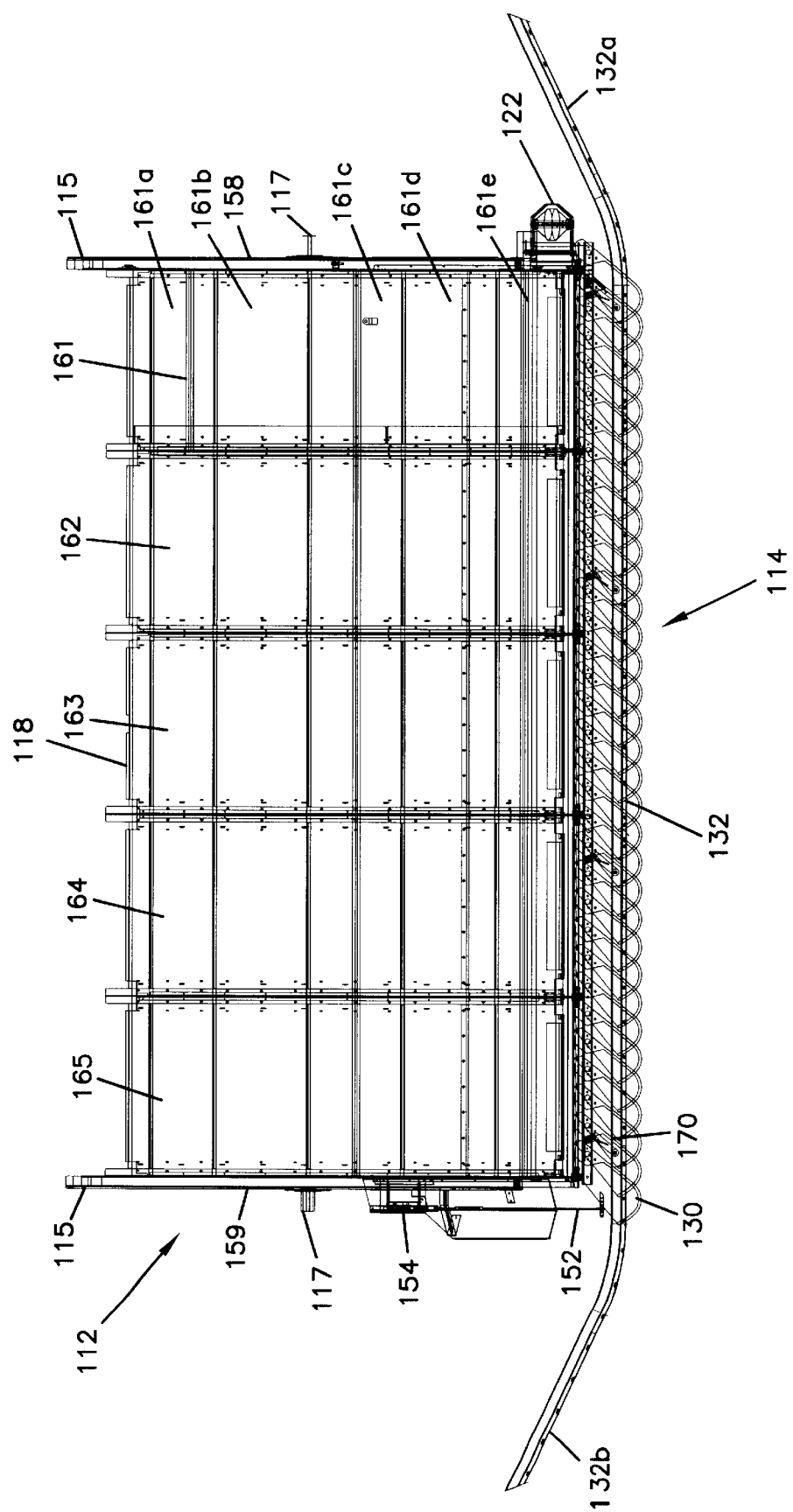
FIG. 5 is a top view illustrating one possible embodiment of the retractable arm shown in FIG. 3.

Referring now to FIG. 3, a side-elevational view of the retractable arm 112 is shown. The illustrated retractable arm 112 is generally rectangular and extends away from the harvester 100 and beneath the foliage of the tree 102. FIG. 5 illustrates a top view of the retractable arm 112. The retractable arm 112 has a first side 158 and a second side 159 opposite the first side 158. In one embodiment, the retractable arm 112 can be generally comprised of one or more sections 161, 162, 163, 164, 165 that span the width of the retractable arm or conveyor 112 from the first side 158 to the second side 159. In this embodiment, each of the sections 161, 162, 153, 164, 165 can include one or more individual, collapsible panels. For example, conveyor section 161 includes individual, collapsible panels 161a, 161b, 161c, 161d, and 161e. The individual, collapsible panels 161a, 161b, 161c, 161d, and 161e collapse longitudinally along the length of the retractable arm 112 from the proximal end portion 118 to the distal end portion 116. As a result, the retractable arm 112 can telescopically extend or retract longitudinally along the length of the retractable arm 112 from the proximal end portion 118 to the distal end portion 116.

In an alternative embodiment, the retractable arm 112 can be comprised of a single section without individual, collapsible panels as described above. In this embodiment, the retractable arm 112 is configured to selectively extend or retract longitudinally along the length of the retractable arm 112 in a non-telescopically fashion.

In the embodiment shown in FIG. 5, the arm 112 is extended and/or retracted using a hydraulic motor 136 that drives a chain 134 coupled to at least one sprocket (not shown) disposed at the proximal and distal end portions 116, 118 of the arm 112. The chain 134 extends the length of the retractable conveyor 112. Furthermore, a second hydraulic motor and chain assembly can be situated along the second side 159 of the arm 112. In so doing, the arm 112 can be extended or retracted evenly. However, it should be understood that the hydraulic motor and chain arrangement can be arranged at any location suitable to extend or retract the arm 112. For example, the hydraulic motor and chain arrangement can be arranged beneath the arm 112.

Figure 6:
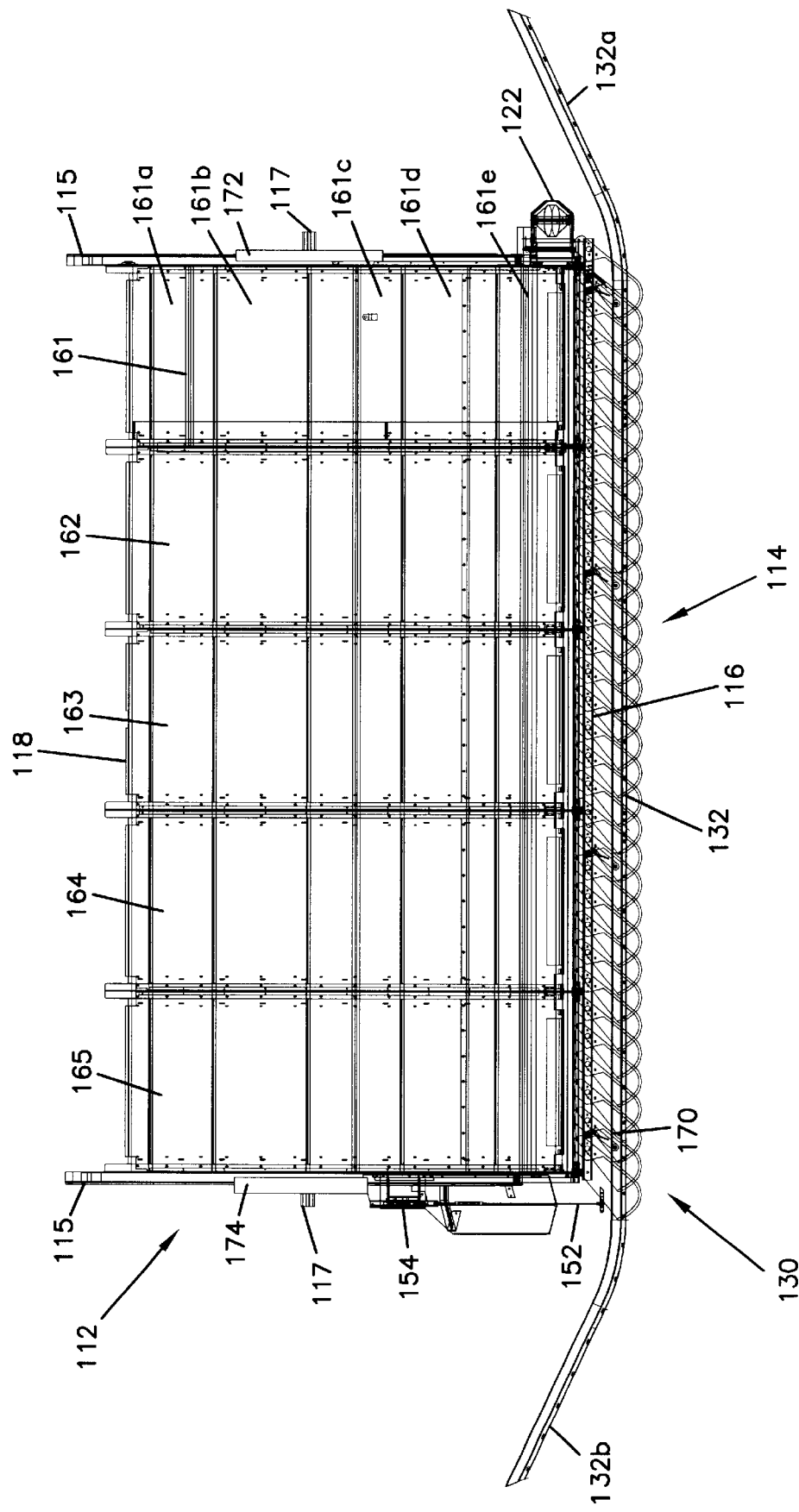
FIG. 6 is a top view illustrating a second possible embodiment of the retractable arm shown in FIG. 3.

In an alternative embodiment shown in FIG. 6, the arm 112 is extended and/or retracted using one or more hydraulic cylinders 172, 174 coupled to proximal and distal end portions 116, 118 of the arm 112 (FIG. 3). In the embodiment shown, the hydraulic cylinders 172, 174 are arranged along the first and second sides 158, 159 of the arm 112. However, it should be understood that the hydraulic cylinders 172, 174 can be arranged in any position suitable to extend or retract the arm 112. For example, at least two phased hydraulic cylinders can be positioned along the first and second sides 158, 159 of the arm 112. In still yet another embodiment, one or more hydraulic cylinders 172, 174 can be arranged above or beneath the arm 112. Preferably, where more than one hydraulic cylinder is used to extend or retract the retractable arm 112, the hydraulic cylinders 172, 174 can be phased hydraulic cylinders, such as those manufactured by Prince Manufacturing Corporation located in North Sioux City, S.Dak. In so doing, the arm 112 can be extended or retracted evenly.

Using either the hydraulic motor 136 and chain 134 assembly or the hydraulic cylinders 172, 174, the arm 112 can be selectively extended or retracted. For example, in the embodiment illustrated in FIGS. 5 and 6, as the arm 112 extends, the overlap between the individual, collapsible panels of each of the conveyor sections 161, 162, 163, 164, and 165 is decreased. Conversely, as the arm 112 retracts, the overlap between the individual, collapsible panels of each of the conveyor sections 161, 162, 163, 164, and 165 is increased.

The retractable arm or conveyor 112 has at least one height control gauge 122 configured to allow the retractable arm or conveyor 112 to move along the ground 124 at a preferred height with the harvester 100. In the embodiment shown in FIG. 3, the height control gauge 122 is constructed as a wheel having a cylindrical center portion 122a, and two opposed frustro-conical end portions 122b, 122c. However, it will be understood that the height control gauge 122 can have any shape, including the shape of a convention cylindrical wheel or a spherical wheel. The shape of the wheel 122 as shown in FIG. 3 allows the conveyor 122 to extend and retract with minimal resistance from the ground 124.

Figure 4:
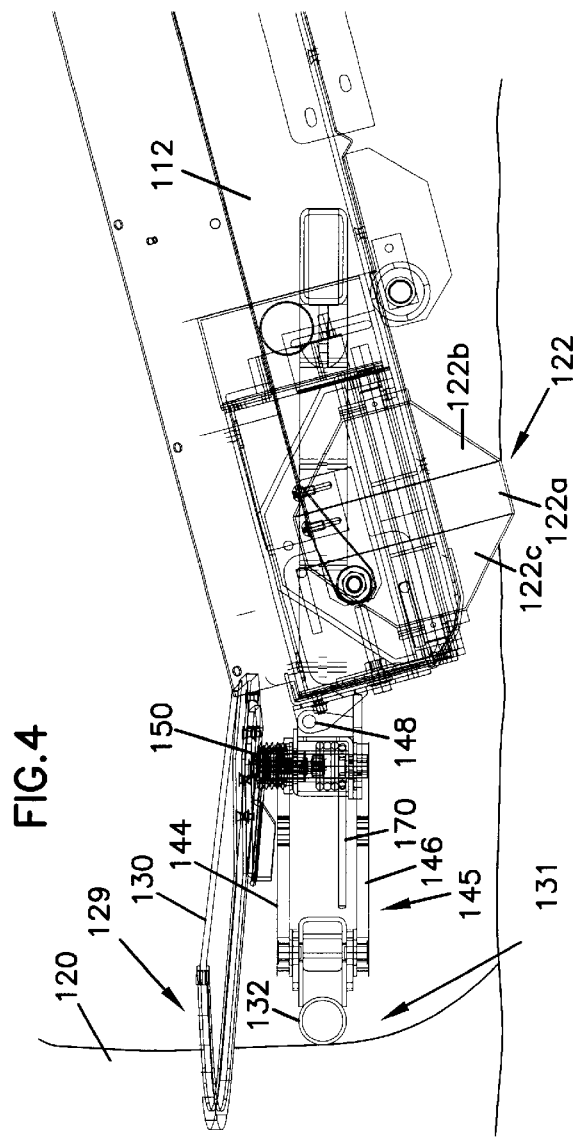
FIG. 4 is an enlarged, side-elevational view illustrating a sealing arrangement disposed at a distal end of the arm of FIG. 3.

Referring now to FIG. 4, a sealing arrangement 114 is provided at the distal end 116 of the retractable arm 112. The sealing arrangement 114 includes a sealing member 129 and a sensor 131 configured to engage the lower portion or trunk 120 of the tree 102. By "engage," it is meant that the sensor 131 contacts or comes into close association or connection with the lower portion or trunk 120 of the tree 102. In so doing, the sensor 131 is able to control the retractable arm 112. By "control," it is meant that the sensor 131 is configured to provide input to either the hydraulic motor 136 or the hydraulic cylinders 172, 174 to selectively extend and retract the retractable arm 112 in accordance with a pressure being applied to the sensor such that a seal is maintained between the harvester 100 and the tree trunk 102.

In a first embodiment, the sealing member 129 includes a plurality of overlapping pivot plates or fish scale members 130. By "overlapping," it is meant that the leading edge of each of the pivot plates are positioned above or beneath a rear edge of an adjacent pivot plate such that no gap exists between any two adjacent pivot plates. While the illustrated sealing member 129 includes a plurality of overlapping pivot plates, it should be understood that the sealing member 129 can be any suitable member for maintaining a seal between the distal end 116 of the retractable arm 112 and the tree 102, such as a rubber seal member or a brush-like member having bristles that form a seal. The overlapping pivot plates 130 extend from the distal end 116 of the retractable arm 112. The pivot plates 130 are constructed and arranged to accommodate a desired object as the harvester 100 advances in a first direction. By "accommodate," it is meant that the pivot plates 130 cooperate to conform to the contour of the desired object, thereby forming a seal between the harvester 100 and the object. In the embodiment shown, the pivot plates 130 cooperate to conform to the contour of the tree trunk 120, thereby forming a seal between the harvester 100 and the tree trunk 120.

Furthermore, in this first embodiment, the sensor includes a sensor bar 132 extending from the distal end portion 116 and along the width of the retractable conveyor 112. The sensor bar 132 is mounted at the distal end portion 116 of the retractable conveyor 112 by cooperating linkage arms 145 as shown in FIG. 4. The sensor bar is generally a straight, flat or tubular member. It should be understood, however, that the sensor bar 132 is not intended to be limited to such arrangements and can generally take on any suitable configuration for engaging the tree trunk 120. Preferably, the sensor bar 132 extends from the first end 158 of the conveyor 112 to the second end 159 of the conveyor 112.

As shown in FIG. 5, the sensor bar 132 has a leading end portion 132a and a trailing end portion 132b. In one embodiment, the leading end portion 132a extends beyond the first end 158 of the conveyor 112 and the trailing end portion 132b extends beyond the second end 159 of the conveyor 112. Alternatively, sensor bar 132 can have a length approximately equal to about the width of the retractable arm 112. The leading end portion 132a defines an arcuate or curved region of the sensor bar 132. Accordingly, as the harvester 100 advances along a row of trees, the leading end portion 132a gradually engages an oncoming tree and decreases the tendency of the sensor bar to become snagged. Similarly, the trailing end portion 132b defines an arcuate or curved region of the sensor bar 132. As a result, as the harvester 100 advances along a row of trees, the trailing end portion 132b gradually disengages the tree trunk 120. Thus, the sensor bar 132 allows an operator to continuously drive the harvester 100 adjacent to the trees 102 within a predetermined distance such that the pivot plates 130 maintain a seal with the trees 102. Similarly, the sensor bar 132 also prevents damage to the pivot plates 130 as the harvester 100 advances along the trees 102.

Preferably, the sensor bar 132 is mounted at the distal end portion 116 of the retractable arm 112 using at least about two (2) pairs of cooperating parallel linkage arms 145. However, it will be understood by those having ordinary skill in the art that the number of cooperating parallel linkage arms 145 used to support the sensor bar 132 can be varied according to the weight and width of the conveyor 112 as well as other considerations. Each pair of cooperating parallel linkage arms 145 includes an upper linkage arm 144 and a lower linkage arm 146. As shown in FIG. 4, the lower linkage arm 146 is pivotably connected to the distal end portion 116 of the retractable arm 112 at pivot point 148. As a result, the sensor bar 132 is able to pitch or rotate in relation to the distal end portion 116 of the arm 112. Similarly, the plurality of overlapping pivot plates 130 can also pitch or rotate to guide the produce towards the conveyor or arm 112 as it falls from the tree 102. Preferably, the sensor bar 132 is configured and arranged substantially perpendicular to the trunk 120.

Moreover, the upper and lower linkage arms 144, 146 are biased such that the sensor bar 132 is fully extended from the distal end portion 116 of the retractable arm 112. For example, as shown in FIGS. 5 and 6, a spring 170 biases the sensor bar 132 such that it is fully extended from the distal end portion 116 of the arm 112. An adjustable chain (not shown) is provided to allow the distance or space between the sensor bar 132 and the distal end portion 116 of the arm 112 to be either increased or decreased so that the desired degree of sealing overlap can be set.

Figure 8:
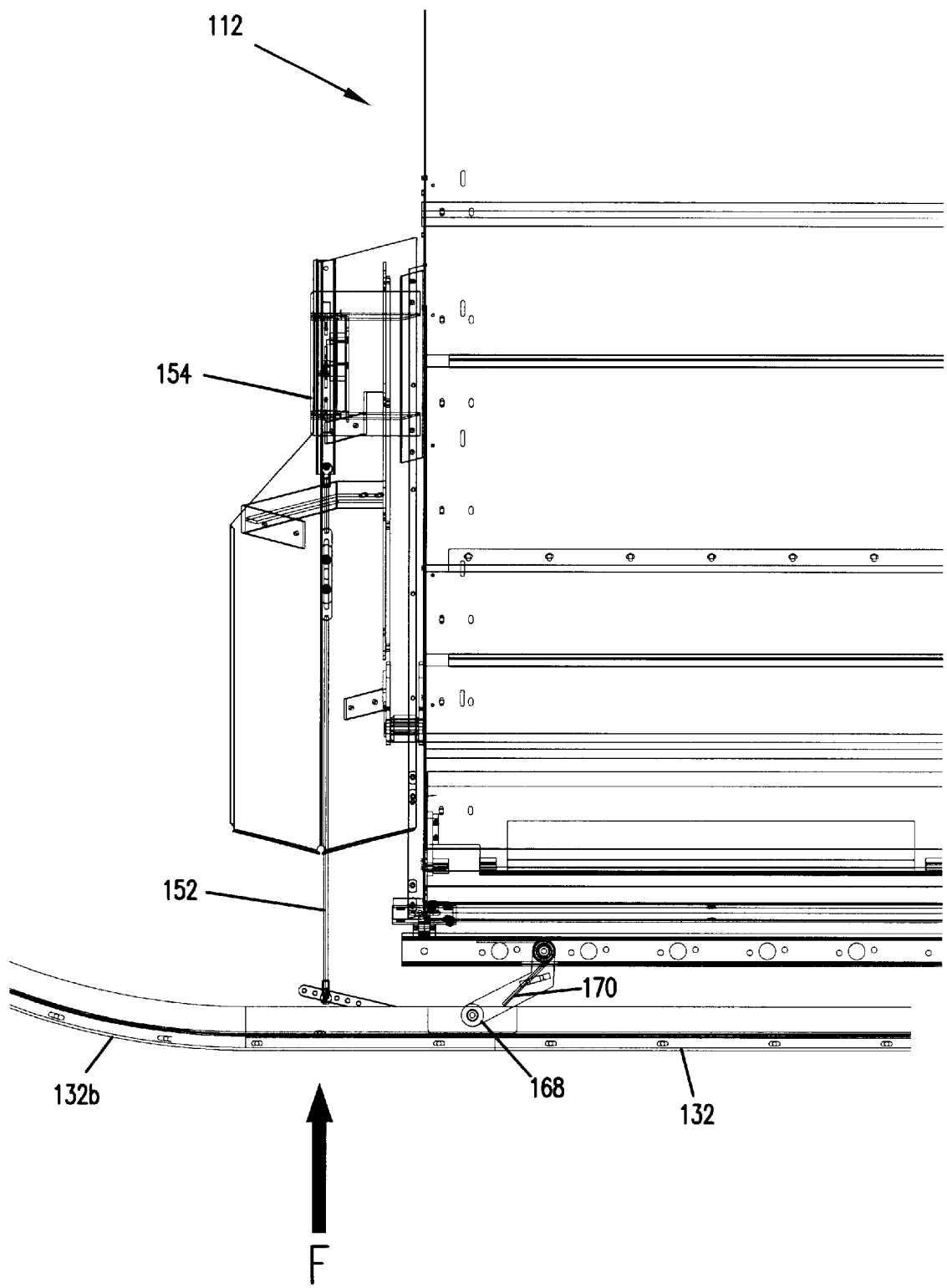
FIG. 8 is an enlarged, segmented, top view of the retractable arm shown in FIGS. 3 and 5 illustrating a sensor bar in an actuated state.

As shown in FIG. 8, the upper and lower linkage arms 144, 146 are constructed and arranged to allow the sensor bar 132 to move towards the distal end portion 116 when a force F (FIG. 8) is applied to the sensor bar 132 in a direction towards the retractable conveyor 112. The force F is typically applied to the sensor bar 132 as the sensor bar 132 engages the tree 102. Accordingly, as the retractable arm 112 is moved closer to the tree 102, the force F acting on the sensor bar 132 is increased. Conversely, as the retractable arm 112 is moved away from the tree 102, the force F acting on the sensor bar 132 is reduced. As shown, the linkage arms 144, 146 preferably are arranged such that they are not perpendicular to the distal end portion 116 when fully extended. Thus, when the sensor bar 132 engages the tree 102, the upper and lower linkage arms 144, 146 can move towards the distal end portion 116 of the arm 112 with minimal resistance and strain on the sensor bar 132 and/or the linkage arms 144, 146.

Figure 7:
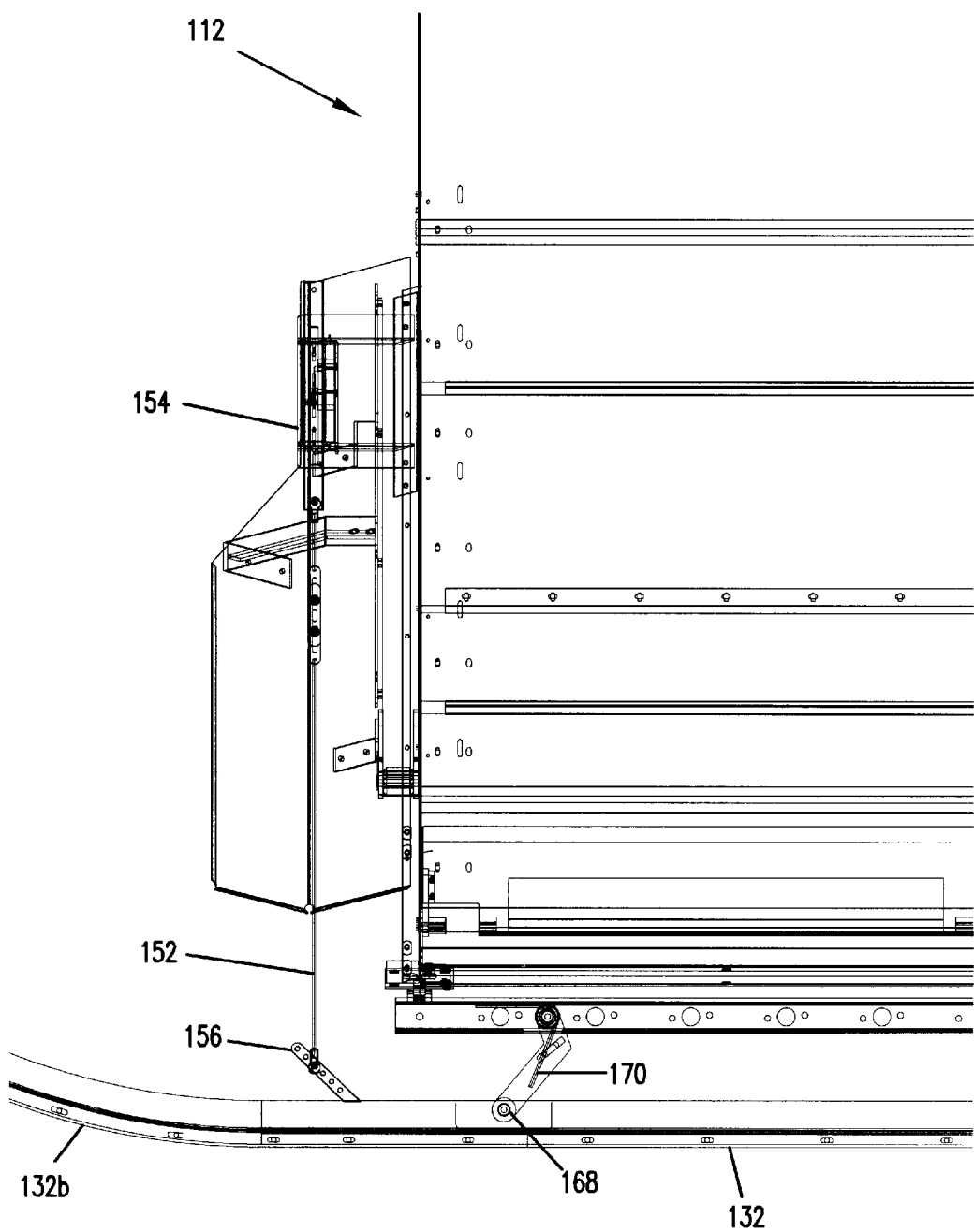
FIG. 7 is an enlarged, segmented, top view of the retractable arm shown in FIGS. 3 and 5 illustrating a sensor bar in an unactuated state.

As can be seen in FIGS. 7 and 8, a connecting member 156 mechanically couples the sensor bar 132 to a linkage rod assembly 152. The linkage rod assembly 152 extends along the second end 159 of the arm 112. However, it should be understood that the linkage rod assembly 152 and the connection member 156 can be arranged at any suitable location along the sensor bar 132. Furthermore, the linkage rod assembly 152 is also coupled to an actuating assembly 154 that is configured to selectively extend or retract the arm 112.

In one embodiment, the actuating assembly 154 includes a conventional micro switch, such as a solenoid switch that actuates the conveyor 112. The actuating assembly 154 is selectively positionable between a first, second, and third or neutral state. In the first state, the actuating assembly 154 is triggered to retract the conveyor 112. In the second state, the actuating assembly 154 is triggered to extend the conveyor 112. In the third state (e.g., between the first and second states), the actuating assembly 154 is not triggered and the conveyor 112 is, therefore, not extended or retracted.

Figure 9:
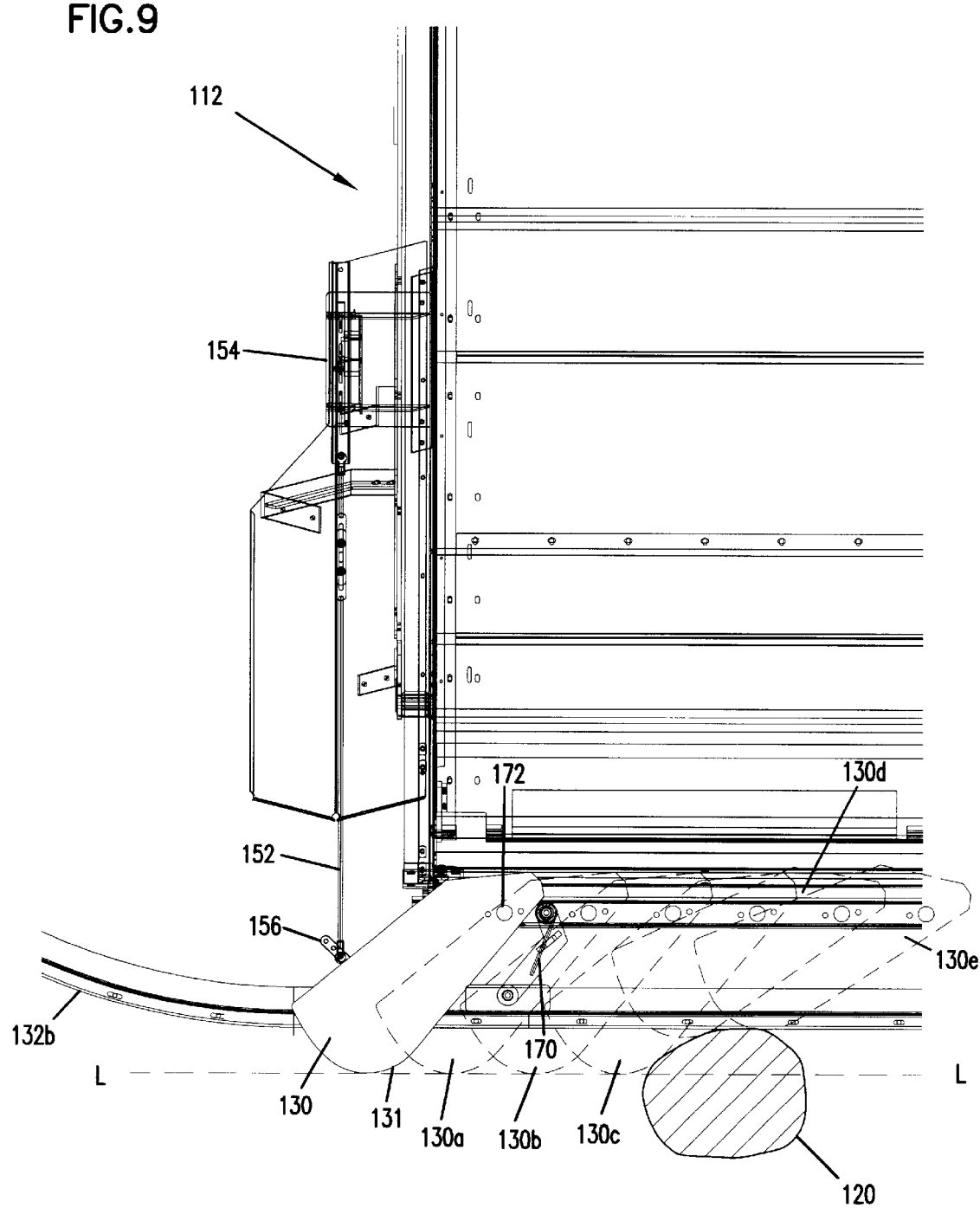
FIG. 9 is an enlarged, segmented, top view illustrating one possible embodiment of the sealing arrangement in accordance with the present disclosure.

For example, as the sensor bar 132 is compressed by a force F (e.g. a tree 102) as shown in FIGS. 8 and 9, the linkage rod 152 urges the actuating assembly 154 into its first state to retract the arm 112. The actuating assembly 154 provides input to either the hydraulic motor 136 or the hydraulic cylinders 172, 174, thereby retracting the arm 112. The arm 112 retracts until the arm 112 is completely retracted or until the actuating assembly 154 reaches its neutral state. The neutral state is achieved when a predetermined force is applied to the sensor bar 132 that allows the overlapping pivot plate assembly 130 to form an adequate seal around the tree 120 without risking damage to the sensor bar 132 or the overlapping pivot plates 130.

Conversely, as the arm 112 retracts, thereby reducing the force F exerted against the sensor bar 132, the linkage rod 152 urges the actuating assembly 154 into its second state to extend the conveyor 112. The actuating assembly 154 again provides input to the either the hydraulic motor 136 or the hydraulic cylinders 172, 174. However, in this case, the hydraulic motor 136 or the hydraulic cylinders 172, 174 cause the conveyor 112 to extend. The conveyor 112 extends until the conveyor 112 is completely extended or until the actuating assembly 154 reaches its neutral state. As discussed above, the neutral state is achieved when a predetermined force is applied to the sensor bar 132 that allows the overlapping pivot plate assembly 130 to form an adequate seal around the tree 120 without risking damage to the sensor bar 132 or the overlapping pivot plates 130.

As discussed above, the sealing arrangement 114 also includes a sealing member 129. For example, in the embodiment illustrated in FIG. 9, the sealing member 129 includes a plurality of overlapping pivot plates or fish scale members 130. The overlapping pivot plates 130 are pivotably mounted at the distal end 116 of the retractable arm or conveyor 112. The pivot plates 130 are constructed and arranged to accommodate a desired object as the harvester 100 advances in a first direction. By "accommodate," it is meant that the pivot plates 130 cooperate to conform to the contour of the desired object, thereby forming a seal between the harvester 100 and the object. A coil spring 150 is disposed beneath each of the overlapping pivot plates 130 (FIG. 4). As a result, each of the overlapping pivot plates 130 are spring biased such that they extend away from the distal end 116 of the conveyor 112.

Furthermore, as shown in FIG. 9, the overlapping pivot plates 130 extend beyond the sensor bar 130. Thus, as the harvester 100 advances adjacent to the trunk 120 of a tree, the sensor bar 132 engages or rubs against the trunk 120 of the tree. Similarly, the pivot plates 130 also engage the trunk 120 of the tree 102. As can be seen from FIG. 9, the overlapping pivot plates 130 cooperate to form a seal against the tree trunk 120. Preferably, the overlapping pivot plates 130 cooperate to form a seal about a centerline L of the tree 102.

Figure 10:
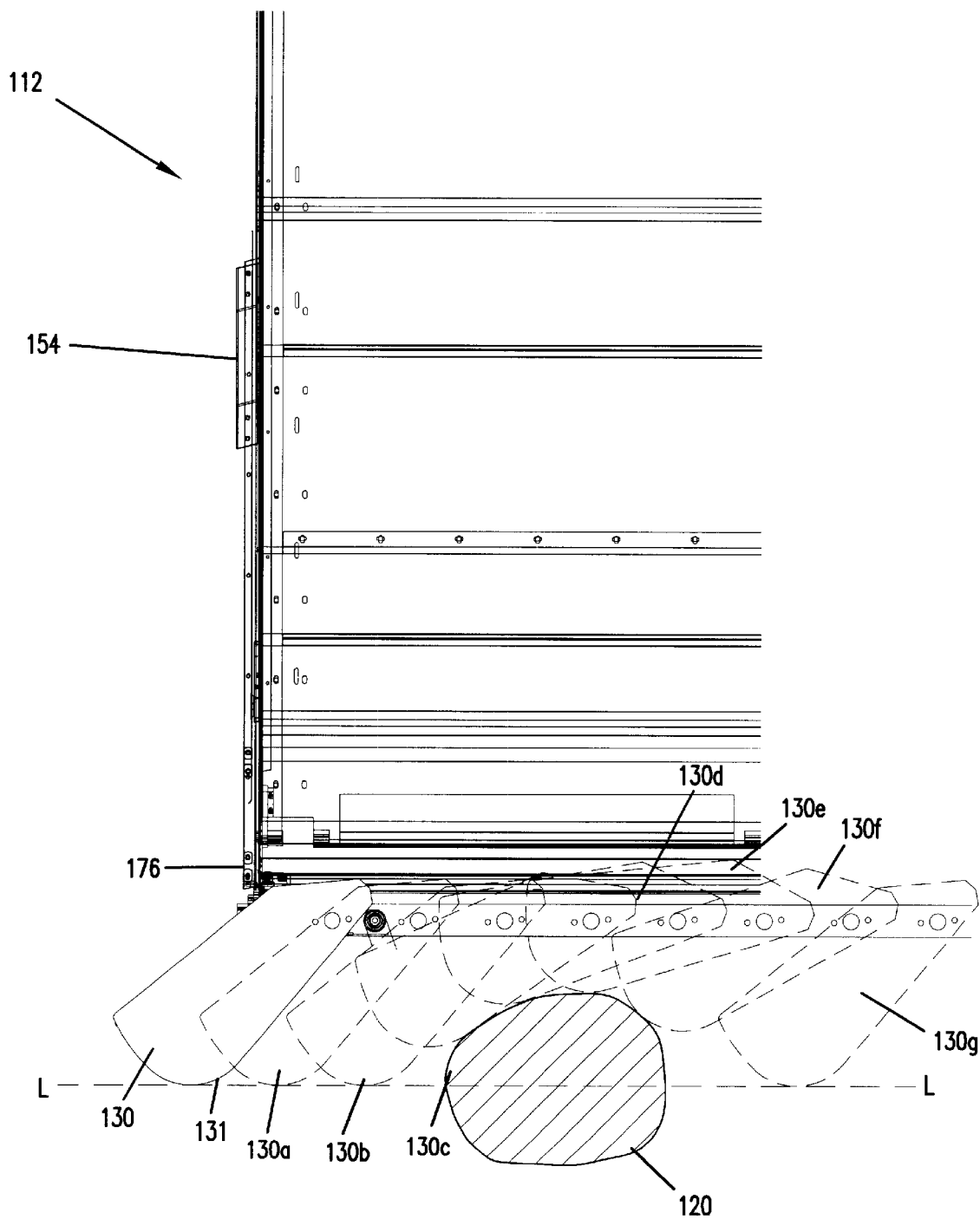
FIG. 10 is an enlarged, segmented, top view illustrating a second possible embodiment of the sealing arrangement in accordance with the present disclosure.

In a second embodiment illustrated in FIG. 10, the sensor includes a rotary sensor or switch 176 as is commonly understood in art. In this embodiment, one or more rotary sensors or switches 176 can be coupled to a corresponding one or more of the pivot plates 130. In this embodiment, the sensor bar 132 is not required. However, it will be understood by those of ordinary skill, that bar similar in construction to the sensor bar 132 can be used as a guard to protect the distal end 116 of the conveyor 112 as well as the pivot plates 130.

Preferably, one or more of the overlapping pivot plates 130 are pivotably mounted at the distal end 116 of the conveyor 112 using a rotary switch 176. The rotary switch 176 is coupled to an actuating assembly 154, such as a micro switch, that is configured to selectively extend or retract the conveyor 112. As discussed above, the actuating assembly 154 is selectively positionable between a first, a neutral, and a second state. The rotary switch 176 provides input to the actuating assembly 154 according to the angular displacement of the corresponding pivot plate. In the first state, the actuating assembly 154 is triggered to retract the arm 112. In the neutral state, the actuating assembly 154 is not triggered and the arm 112 is, therefore, not extended or retracted. In the second state, the actuating assembly 154 is triggered to extend the arm 112.

For example, as the harvester 100 advances adjacent to the tree trunk 120, the leading edges 131 of the pivot plates 130 engages the tree trunk 120 as shown in FIG. 10. The pivot plates 130 corresponding to the location of the tree trunk 120 are rotated. As the pivot plates 130 are rotated, the actuating assembly 154 is switched from its neutral state to its first state. Accordingly, the arm 112 is retracted.

Conversely, when all of the pivot plates 130 are fully rotated, the actuating assembly 154 is switched into its second state. Accordingly, the conveyor 112 is extended. The arm 112 extends until it is fully extended or until the actuating assembly 154 is switched to its neutral state.

Moreover, as discussed above, the harvester 100 can work in conjunction with a second harvester (not shown) while harvesting produce from one or more trees 102. In this embodiment, each harvester 100 moves along a row of trees 102 at substantially the same rate and on opposite sides of the same tree 102. As a result, each harvester 100 removes produce from about approximately half of the tree 102. Furthermore, the sealing arrangement 114 as described above forms and maintains a seal between each tree 102 and both harvesters 100 while advancing adjacent to the trees 102, thereby minimizing the amount of produce lost.

As a result of this arrangement, the overlapping pivot plates 130 are able to form a seal between harvester 100 and the tree trunk 120. More specifically, the overlapping pivot plates 130 form a seal between the distal end 116 of the conveyor 112 and a centerline L of the tree trunk 120.

The above specification and embodiments are believed to provide a complete description of the manufacturer and use of particular embodiments of the invention. Many embodiments of the invention can be made without departing from the spirit and scope of the invention, which is limited by the attached claims.

I claim:

1. A harvester for gathering produce from one or more plants, the harvester comprising:
   (a) a drive mechanism for automatically advancing the harvester along a first direction relative to the plants;
   (b) a retractable conveyor mounted to and extending from the drive mechanism towards the plant, the retractable conveyor being selectively positionable between a first position and a second position; and
   (c) a sealing arrangement mounted at a distal end of the retractable conveyor; the sealing arrangement including an integral sensor input and sealing member arranged between the harvester and at least one of the plants configured to engage at least one of the plants and provide input to the retractable conveyor so as to maintain a predetermined distance between the distal end of the retractable conveyor and at least one corresponding plant, thereby forming a seal between the harvester and each corresponding plant.

2. A harvester for gathering produce from one or more plants, the harvester comprising:
   (a) a drive mechanism for automatically advancing the harvester along a first direction relative to the plants;
   (b) an agitator constructed and arranged to engage the plants and remove produce from the plant as the harvester moves in the first direction;
   (c) a retractable conveyor mounted to and extending from the drive mechanism towards the plant, the retractable conveyor being selectively positionable between a first position and a second position; and
   (d) a sealing arrangement mounted at a distal end of the retractable conveyor; the sealing arrangement including:
      (i) a sealing arrangement arranged between the harvester and at least one of the plants including a plurality of pivot plates mounted along the distal end of the retractable conveyor, wherein a leading edge of each of the pivot plates is positioned above or beneath a rear edge of an adjacent pivot plate such that no gap exists between any two adjacent pivot plates; and
      (ii) a sensor comprising the plurality of overlapping pivot plates configured to engage the plant and provide input to the retractable conveyor so as to maintain a predetermined distance between the distal end of the retractable conveyor and at least one corresponding plant, thereby forming a seal between the harvester and each corresponding plant.

3. The harvester according to claim 2, wherein:
   (a) the agitator comprises at least one whorl arrangement; each of the whorl arrangements being capable of rotating and engaging the plants and forcibly removing produce from the plant as the harvester moves in the first direction.

4. The harvester according to claim 3, wherein:
   (a) each of the whorls are capable of rotating about a vertical axis substantially perpendicular to the ground surface about which the harvester travels.

5. The harvester according to claim 3, wherein:
   (a) each of the whorls is capable of reciprocating in a linear motion substantially perpendicular to the first direction.

6. The harvester according to claim 2, wherein:
   (a) the retractable conveyor is constructed and arranged to extend between and engage at least two plants positioned along a row in a direction parallel to the first direction.

7. The harvester according to claim 2, wherein:
   (a) the sensor comprises a sensor bar extending from the distal end of the retractable conveyor, the sensor bar being configured to engage a lower portion of the plants as the harvester travels along the first direction.

8. The harvester according to claim 2, wherein:
   (a) each of the pivot plates is spring biased to engage the lower portion of the plants as the harvester travels along the first direction.

9. The harvester according to claim 2, wherein:
   (a) at least one of the pivot plates is coupled to a rotary switch capable of extending the retractable conveyor when each of the pivot plates coupled to the rotary switch are fully extended.

10. The harvester according to claim 2, wherein:
    (a) at least one of the pivot plates is coupled to a rotary switch capable of retracting the retractable conveyor when at least one of the pivot plates coupled to the rotary switch is at least partially rotated.

11. A fruit harvester for maintaining a seal between the harvester and a second object, the harvester being configured to move relative to the second object, the harvester comprising:
    (a) a retractable arm mounted to and extending from the harvester towards the second object; the retractable arm being selectively positionable between a first position and a second position; and
    (b) a sealing arrangement mounted at a distal end of the retractable arm; the sealing arrangement including:
       a plurality of overlapping pivot plates pivotably mounted along the distal end of the retractable arm, the plurality of overlapping pivot plates being constructed and arranged to accommodate the second object as the harvester travels along a first direction;
       wherein each of the pivot plates is biased to engage the second object as the harvester travels along the first direction and wherein at least one of the pivot plates is coupled to a switch configured to provide input to the retractable arm to maintain a predetermined distance between the distal end of the retractable arm and the second object, thereby maintaining the seal between the harvester and the second object.

* * * * *